US012643467B2

(12) United States Patent
Shibata et al.

(10) Patent No.: US 12,643,467 B2
(45) Date of Patent: Jun. 2, 2026

(54) COMMUNICATION LAMP FOR VEHICLE

(71) Applicant: KOITO MANUFACTURING CO., LTD., Tokyo (JP)

(72) Inventors: Yuichi Shibata, Shizuoka (JP); Honami Fujii, Shizuoka (JP); Kouhei Murata, Shizuoka (JP); Kouki Hizumi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/834,313

(22) PCT Filed: Jan. 11, 2023

(86) PCT No.: PCT/JP2023/000447
§ 371 (c)(1),
(2) Date: Jul. 30, 2024

(87) PCT Pub. No.: WO2023/145433
PCT Pub. Date: Aug. 3, 2023

(65) Prior Publication Data
US 2025/0153633 A1      May 15, 2025

(30) Foreign Application Priority Data
Jan. 31, 2022      (JP) ................................. 2022-013307

(51) Int. Cl.
B60Q 1/50      (2006.01)
B60Q 1/26      (2006.01)
B60Q 1/28      (2006.01)

(52) U.S. Cl.
CPC ............ B60Q 1/549 (2022.05); B60Q 1/2607 (2013.01); B60Q 1/28 (2013.01); B60Q 2400/20 (2013.01); B60Q 2900/40 (2022.05)

(58) Field of Classification Search
CPC ........ B60Q 1/549; B60Q 1/2607; B60Q 1/28; B60Q 2400/20; B60Q 2900/40; B60Q 1/30; Y02B 20/40
See application file for complete search history.

(56) References Cited

U.S. PATENT DOCUMENTS

| 9,902,314 | B1 * | 2/2018 | Salter | ..................... B60Q 1/268 |
| 2012/0242227 | A1 * | 9/2012 | Miller | ..................... B60Q 3/80 |
| | | | | 315/312 |

(Continued)

FOREIGN PATENT DOCUMENTS

| EP | 3726931 A1 | 10/2020 |
| EP | 4094988 A1 | 11/2022 |

(Continued)

OTHER PUBLICATIONS

International Search Report in corresponding International Application No. PCT/JP2023/000447, dated Mar. 20, 2023 (9 pages).

(Continued)

*Primary Examiner* — Omeed Alizada
(74) *Attorney, Agent, or Firm* — Osha Bergman Watanabe & Burton LLP

(57) ABSTRACT
A communication lamp for a vehicle includes a light source unit including a multi-color light source configured to emit light of a plurality of colors, and an illumination control unit configured to control the light source unit such that colors of the light emitted from the light source unit change over time.

6 Claims, 18 Drawing Sheets

(56)         References Cited

U.S. PATENT DOCUMENTS

| | | | | |
|---|---|---|---|---|
| 2018/0304804 A1 * | 10/2018 | Tatara | .................. | B60Q 1/2607 |
| 2022/0017010 A1 * | 1/2022 | Taniguchi | .............. | G08G 1/005 |
| 2022/0262211 A1 * | 8/2022 | Ordone | ................ | G09F 13/044 |
| 2022/0349544 A1 * | 11/2022 | Yamamoto | ........... | F21S 41/125 |

FOREIGN PATENT DOCUMENTS

| | | |
|---|---|---|
| GB | 2440566 A | 2/2008 |
| JP | S63-082645 U | 5/1988 |
| JP | 2003-011720 A | 1/2003 |
| JP | 2011-076568 A | 4/2011 |
| JP | 3216635 U | 6/2018 |
| JP | 2021-136140 A | 9/2021 |
| KR | 2013-0000126 A | 1/2013 |
| WO | 2021-149559 A1 | 7/2021 |

OTHER PUBLICATIONS

Written Opinion in corresponding International Application No. PCT/JP2023/000447, dated Mar. 20, 2023 (5 pages).
Extended European Search Report issued in corresponding European Patent Application No. 23746648.7, mailed on Feb. 17, 2025 (12 pages).

* cited by examiner

CYCLE: 1000 ms, COLOR: YELLOW → GREEN

CYCLE: 1000 ms, COLOR: AMBER → GREEN → YELLOW

CYCLE: 1000 ms, COLOR: AMBER → GREEN

CYCLE: 2000 ms, COLOR: YELLOW

CYCLE: 1000 ms, COLOR: PINK

CYCLE: 2000 ms, COLOR: PINK

CYCLE: 2000 ms, COLOR: AMBER

FIG. 16

CYCLE: 1000 ms, COLOR: GREEN

CYCLE: 2000 ms, COLOR: AMBER

CYCLE: 2000 ms, COLOR: AMBER

1

COMMUNICATION LAMP FOR VEHICLE

TECHNICAL FIELD

The present disclosure relates to a communication lamp for a vehicle.

BACKGROUND ART

Patent Literature 1 discloses a vehicle lamp in which a plurality of light emitting elements are arranged along a curved surface of a transparent cover curved in a three-dimensional direction.

CITATION LIST

Patent Literature

Patent Literature 1: JP2021-136140A

SUMMARY OF INVENTION

Technical Problem

Nowadays, one may express gratitude to a traffic participant such as another vehicle for giving way by turning on or blinking a turn signal lamp. However, since an existing vehicle lamp such as a turn signal lamp has another intention to be originally expressed, a traffic participant (another vehicle, a pedestrian, or the like) may not be able to immediately feel that one tries to express gratitude or the like.

An object of the present disclosure is to provide a communication lamp for a vehicle that enables a traffic participant to reliably feel predetermined information such as gratitude.

Solution to Problem

A communication lamp for a vehicle according to one aspect of the present disclosure includes:

a light source unit including a multi-color light source configured to emit light of a plurality of colors; and an illumination control unit configured to control the light source unit such that colors of the light emitted from the light source unit change over time.

According to the above configuration, the light emitted from the light source unit can be emitted to the outside with colors of the light being changed over time. An existing vehicle lamp such as a brake lamp or a turn signal lamp does not change a color of light. On the other hand, in the communication lamp for a vehicle having the above configuration, since the colors of the light are changed, a traffic participant immediately notices that the communication lamp for a vehicle is turned on with an intention different from an intention indicated by turning on a brake lamp or a turn signal lamp. Therefore, the communication lamp for a vehicle having the above configuration enables a traffic participant to reliably feel predetermined information such as gratitude.

In a communication lamp for a vehicle according to another aspect of the present disclosure, the communication lamp is configured to blink and turn on light having a wavelength of 500 nm or more and having x in an xy chromaticity diagram of 0.6 or less, which expresses gratitude.

According to a sensory test to be described later, it was confirmed that the light having the wavelength of 500 nm or more evokes a warm feeling of gratitude. It was confirmed that when x increased, red was strong, and a meaning of warning was strong, but when the x in the xy chromaticity diagram was 0.6 or less, people can recognize a warm color that does not evoke a strong feeling. It was confirmed that when the x in the xy chromaticity diagram is 0.6 or less, it is easy to recognize an intention different from an intention indicated by turning on the existing brake lamp or turn signal lamp. Therefore, according to the communication lamp having the above configuration, it is easy for a traffic participant to reliably feel gratitude.

Advantageous Effects of Invention

According to the present disclosure, it is possible to provide a communication lamp for a vehicle that enables a traffic participant to reliably feel predetermined information such as gratitude.

BRIEF DESCRIPTION OF DRAWINGS

FIG. 16 is a diagram showing a change in the turning-on state of the light source unit.

DESCRIPTION OF EMBODIMENTS

Figure 1:
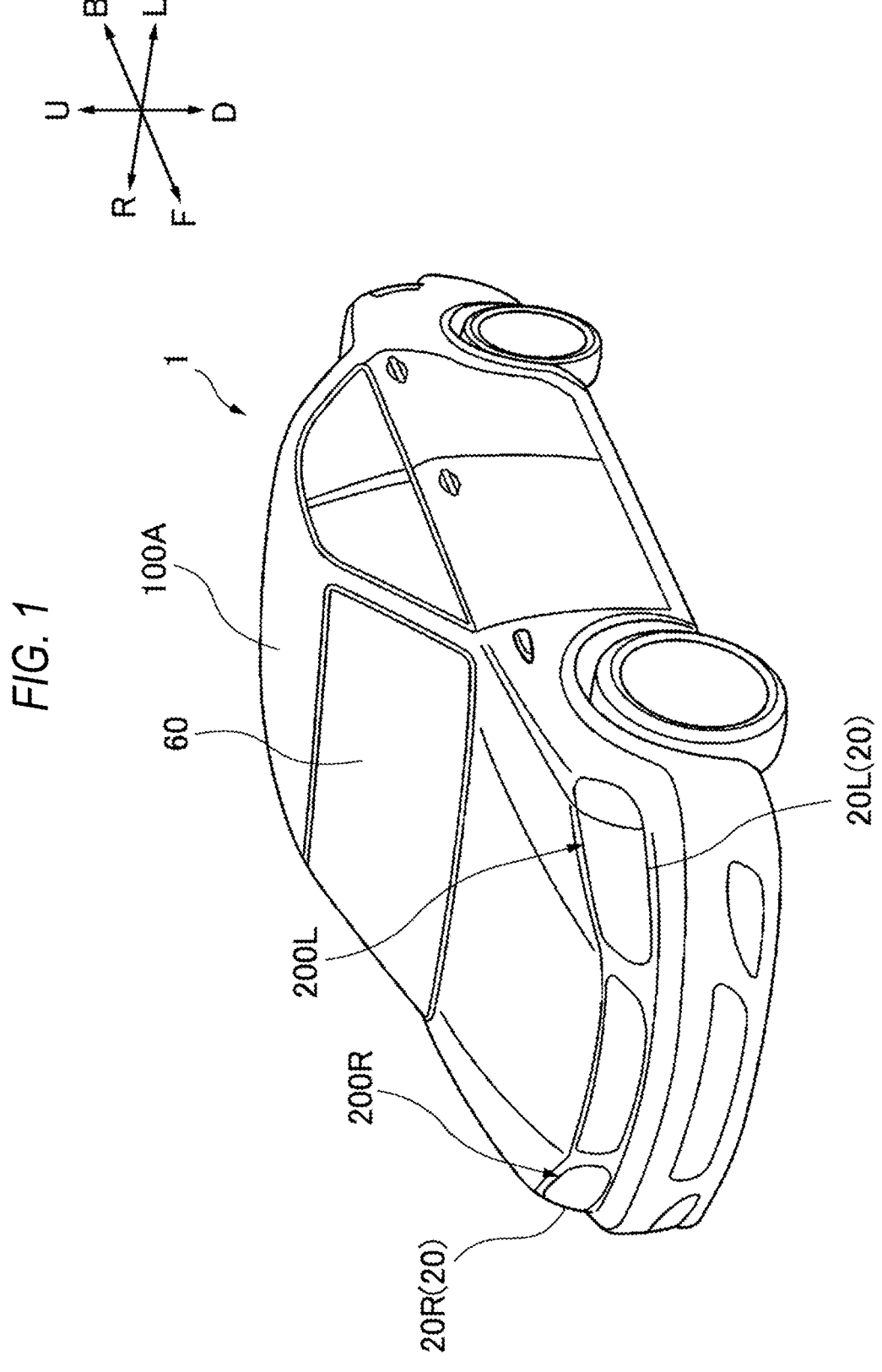
FIG. 1 is a perspective view showing a vehicle including a vehicle system according to an embodiment of the present disclosure.

Hereinafter, an embodiment of the present disclosure (hereinafter, referred to as the present embodiment) will be described with reference to the drawings. Dimensions of members shown in the drawings may be different from actual dimensions of the members for convenience of description.

In the description of the present embodiment, a "left-right direction", an "up-down direction", and a "front-rear direction" may be appropriately referred to for convenience of description. These directions are relative directions set for a vehicle 1 shown in FIG. 1. Here, the "left-right direction" is a direction including a "left direction" and a "right direction", and is also a vehicle width direction of the vehicle 1. The "up-down direction" is a direction including an "up direction" and a "down direction". The "front-rear direction" is a direction including a "front direction" and a "rear direction". The front-rear direction is a direction orthogonal to the left-right direction and the up-down direction. In FIG. 1, a reference numeral U indicates an up direction. A reference numeral D indicates a down direction. A reference numeral F indicates a front direction. A reference numeral B indicates a rear direction. A reference numeral L indicates a left direction. A reference numeral R indicates a right direction.

First Embodiment

Figure 2:
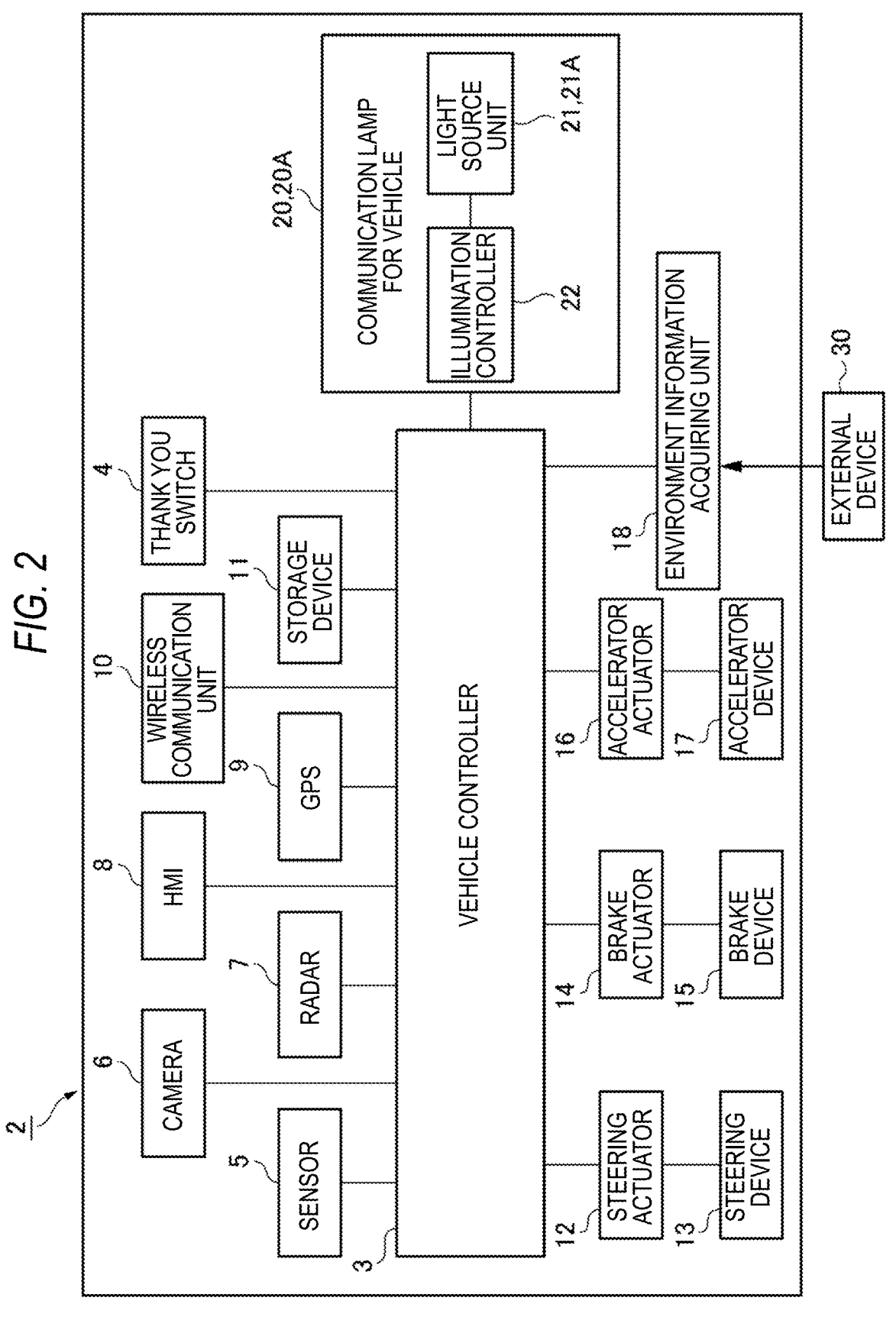
FIG. 2 is a block diagram showing the vehicle system according to the present embodiment.

First, a vehicle system 2 according to the present embodiment will be described below with reference to FIGS. 1 and 2. FIG. 1 is a perspective view showing the vehicle 1 mounted with the vehicle system 2 (see FIG. 2). FIG. 2 is a block diagram showing the vehicle system 2. The vehicle 1 is, for example, a vehicle (an autonomous vehicle) that can travel in a manual driving mode and/or an autonomous driving mode.

As shown in FIG. 2, the vehicle system 2 includes a vehicle control unit 3, a thank you switch 4, a sensor 5, a camera 6, a radar 7, a human machine interface (HMI) 8, a global positioning system (GPS) 9, a wireless communication unit 10, a storage device 11, a steering actuator 12, a steering device 13, a brake actuator 14, a brake device 15, an accelerator actuator 16, an accelerator device 17, an environment information acquiring unit 18, and a communication lamp 20 for a vehicle. The communication lamp 20 for a vehicle includes a light source unit 21 and an illumination control unit 22.

The vehicle control unit 3 is configured to control traveling of the vehicle 1. The vehicle control unit 3 includes, for example, at least one electronic control unit (ECU). The electronic control unit includes a computer system (for example, a system on a chip (SoC)) including one or more processors and one or more memories, and an electronic circuit including an active element such as a transistor and a passive element. The processor includes, for example, at least one of a central processing unit (CPU), a micro processing unit (MPU), a graphics processing unit (GPU), and a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for autonomous driving. The RAM may temporarily store a vehicle control program, vehicle control data, and/or surrounding environment information indicating a surrounding environment of the vehicle. The processor may be configured to load, onto the RAM, a program designated from various vehicle control programs stored in the ROM, and execute various kinds of processing in cooperation with the RAM. The computer system may be implemented by a non-von Neumann computer such as an application specific integrated circuit (ASIC) or a field-programmable gate array (FPGA). Further, the computer system may be implemented by a combination of a von Neumann computer and a non-von Neumann computer.

The thank you switch 4 is a switch that is pressed when it is desired to express gratitude to another traffic participant (another vehicle, a pedestrian, or the like). For example, when a user presses the thank you switch 4 to express gratitude to another traffic participant, a feeling expression signal is generated. The user is, for example, a driver or an occupant of the vehicle 1. The generated feeling expression signal is transmitted to the vehicle control unit 3.

The feeling expression signal is a signal indicating that feeling information related to a feeling such as gratitude is to be transmitted to a traffic participant. In the present embodiment, the feeling expression signal is a signal for switching an operation mode of the light source unit 21 from a general operation mode (an example of a first turning-on mode) in which the light source unit 21 is continuously turned on without being changed to a feeling expression mode (an example of a second turning-on mode) different from the general 25 operation mode. The general operation mode and the feeling expression mode are different in at least one of a manner of turning on the light source unit 21 and a manner of turning off the light source unit 21. The general operation mode is, for example, a mode in which any one of a turn signal lamp, a brake lamp, and a backup lamp exhibits an original function. The thank you switch 4 is preferably a switch different from a so-called hazard switch. Since a situation in which it is desired to press the hazard switch is different from a situation in which it is desired to express gratitude, it is preferable that the hazard switch and the thank you switch are separately provided.

The sensor 5 includes at least one of an acceleration sensor, a speed sensor, and a gyro sensor. The sensor 5 is configured to detect a travel state of the vehicle 1 and output travel state information to the vehicle control unit 3. The sensor 5 may further include a seat sensor configured to detect whether a driver is sitting in a driver seat, a face direction sensor configured to detect a direction of the face of the driver, an external weather sensor configured to detect an external weather condition, a human sensor configured to detect whether there is a person in the vehicle, and the like.

The camera 6 is, for example, a camera including an imaging element such as a charge-coupled device (CCD) or a complementary MOS (CMOS). The camera 6 is configured to detect surrounding environment information indicating a surrounding environment of the vehicle 1 and transmit the surrounding environment information to the vehicle control unit 3.

The radar 7 includes at least one of a millimeter-wave radar, a microwave radar, and a LiDAR unit. For example, the LiDAR unit is configured to detect surrounding environment information based on point cloud data indicating a surrounding environment of the vehicle 1 and transmit the surrounding environment information to the vehicle control unit 3.

The HMI 8 includes an input unit configured to receive an input operation from a driver and an output unit configured to output travel information of the vehicle 1 and the like to the driver. The input unit includes a steering wheel, an accelerator pedal, a brake pedal, a driving mode changeover switch for switching a driving mode of the vehicle 1, and the like. The output unit is a display device (for example, HUD) configured to display various kinds of travel information. The HUD is configured to display travel information of the vehicle 1 on a front window 60 (see FIG. 1). The GPS 9 is configured to acquire current position information of the vehicle 1 and output the acquired current position information to the vehicle control unit 3.

The wireless communication unit 10 is configured to receive information (for example, travel information) related to another vehicle in the surrounding of the vehicle 1 from the another vehicle, and transmit information (for example, travel information) related to the vehicle 1 to the another vehicle (vehicle-to-vehicle communication). The wireless communication unit 10 is configured to receive infrastructure information from infrastructure equipment such as a traffic light and a sign lamp, and transmit travel information of the vehicle 1 to the infrastructure equipment (road-to-vehicle communication). The wireless communication unit 10 is configured to receive information related to a pedestrian from a portable electronic device (a smartphone, a tablet, a wearable device, or the like) carried by the pedestrian, and transmit own vehicle travel information of the vehicle 1 to the portable electronic device (pedestrian-to-vehicle communication). The vehicle 1 may directly communicate with the another vehicle, the infrastructure equipment, or the portable electronic device in an ad hoc mode, or may communicate with the another vehicle, the infrastructure equipment, or the portable electronic device via an access point. Further, the vehicle 1 may communicate with the another vehicle, the infrastructure equipment, or the portable electronic device via a communication network such as the Internet.

The storage device 11 is an external storage device such as a hard disk drive (HDD) or a solid state drive (SSD). The storage device 11 may store two-dimensional or three-dimensional map information and/or a vehicle control program. For example, the three-dimensional map information may be implemented by point cloud data. The storage device 11 is configured to output the map information or the vehicle control program to the vehicle control unit 3 in response to a request from the vehicle control unit 3. The map information and the vehicle control program may be updated via the wireless communication unit 10 and a communication network.

When the vehicle 1 travels in an autonomous driving mode, the vehicle control unit 3 is configured to autonomously generates at least one of a steering control signal, an accelerator control signal, and a brake control signal based on the travel state information, the surrounding environment information, the current position information, the map information, and the like. The steering actuator 12 is configured to receive the steering control signal from the vehicle control unit 3, and control the steering device 13 based on the received steering control signal. The brake actuator 14 is configured to receive the brake control signal from the vehicle control unit 3, and control the brake device 15 based on the received brake control signal. The accelerator actuator 16 is configured to receive the accelerator control signal from the vehicle control unit 3, and control the accelerator device 17 based on the received accelerator control signal.

A driving mode includes an autonomous driving mode and a manual driving mode. The autonomous driving mode includes a full-autonomous driving mode, an advanced driving support mode, and a driving support mode. In the full-autonomous driving mode, the vehicle system 2 autonomously performs all travel control including steering control, brake control, and accelerator control, and a driver is not in a state in which the driver can drive the vehicle 1. In the advanced driving support mode, the vehicle system 2 autonomously performs all travel control of the steering control, the brake control, and the accelerator control, and the driver is in a state in which the driver can drive the vehicle 1 but does not drive the vehicle 1. In the driving support mode, the vehicle system 2 autonomously performs a part of the travel control including the steering control, the brake control, and the accelerator control, and the driver drives the vehicle 1 under driving support of the vehicle system 2. On the other hand, in the manual driving mode, the vehicle system 2 does not autonomously perform travel control, and the driver drives the vehicle 1 without the driving support of the vehicle system 2.

The driving mode of the vehicle 1 may be switched by operating the driving mode changeover switch. In this case, the vehicle control unit 3 switches the driving mode of the vehicle 1 among four driving modes (the full-autonomous driving mode, the advanced driving support mode, the driving support mode, and the manual driving mode), according to an operation of the driver on the driving mode changeover switch. The driving modes of the vehicle 1 may be autonomously switched based on information related to a travel-allowed section where traveling of an autonomous driving vehicle is allowed or a travel-prohibited section where the traveling of the autonomous driving vehicle is prohibited or information related to an external weather condition. In this case, the vehicle control unit 3 switches the driving modes of the vehicle 1 based on these kinds of information. Further, the driving modes of the vehicle 1 may be autonomously switched by using the seat sensor, the face direction sensor, or the like. In this case, the vehicle control unit 3 switches the driving modes of the vehicle 1, based on output signals from the seat sensor and the face direction sensor.

On the other hand, when the vehicle 1 travels in the manual driving mode, the vehicle control unit 3 generates the steering control signal, the accelerator control signal, and the brake control signal according to a manual operation of the driver on the accelerator pedal, the brake pedal, and the steering wheel. In this manner, since the steering control signal, the accelerator control signal, and the brake control signal are generated by the manual operation of the driver in the manual driving mode, traveling of the vehicle 1 is controlled by the driver.

The environment information acquiring unit 18 is configured to acquire environment information from an external device 30. The external device 30 is, for example, an information terminal device such as a smartphone carried by a user and a car navigation device mounted in the vehicle 1. The environment information is, for example, user feeling information related to a feeling of the user or the like, weather information related to weather in the surrounding of the vehicle 1, and in-vehicle environment information related to an in-vehicle environment. The in-vehicle environment information includes in-vehicle temperature information related to an in-vehicle temperature, in-vehicle humidity information related to in-vehicle humidity, in-vehicle music information related to music played in the vehicle, and the like. The environment information acquiring unit 18 is configured to transmit the environment information acquired from the external device 30 to the illumination control unit 22 via the vehicle control unit 3.

The communication lamp 20 for a vehicle is a lamp for transmitting predetermined information such as gratitude to a traffic participant by turning on or turning off the communication lamp 20 for a vehicle. The communication lamp 20 for a vehicle is, for example, a turn signal lamp, a brake lamp, or a backup lamp. The communication lamp 20 for a vehicle is configured to blink and turn on light having a wavelength of 500 nm or more and having x in the xy chromaticity diagram of 0.6 or less, which expresses gratitude. As will be described in detail in a sensory test to be described later, the light having a wavelength of 500 nm or more and having x in the xy chromaticity diagram of 0.6 or less enables a traffic participant to recognize a warm color that makes the traffic participant have a warm feeling of gratitude and does not evoke a strong feeling such as warning.

As shown in FIG. 1, in the vehicle 1 according to the present embodiment, a turn signal lamp functions as the communication lamp 20 for a vehicle. The vehicle 1 includes a left front communication lamp 20L and a right front communication lamp 20R as the communication lamp 20 for a vehicle. The left front communication lamp 20L is disposed in a lamp chamber of a left headlamp 200L. Alternatively, the left front communication lamp 20L may be provided separately from the left headlamp 200L. The left front communication lamp 20L may be disposed on a roof 100A of the vehicle 1, or may be disposed on a bumper of the vehicle 1.

The right front communication lamp 20R is disposed in a lamp chamber of a right headlamp 200R. Alternatively, the right front communication lamp 20R may be provided separately from the right headlamp 200R. The right front communication lamp 20R may be disposed on the roof 100A of the vehicle 1, or may be disposed on a bumper of the vehicle 1.

Referring back to FIG. 2, the light source unit 21 and the illumination control unit 22 provided in the communication lamp 20 for a vehicle will be described. The light source unit 21 may include a light emitting diode (LED) element or a laser diode (LD) element. In the present embodiment, the light source unit 21 includes a multi-color light source configured to emit light of a plurality of colors. The multi-color light source is a light source having two or more different light emission hues. Brightness of the light source unit 21 is proportional to a magnitude of a current value flowing through the light source included in the light source unit 21. Accordingly, the larger the current value flowing through the light source included in the light source unit 21, the brighter the light source unit 21. The light source unit 21 may include at least a first light source configured to emit first light and a second light source configured to emit second light having a color different from a color of the first light.

In the present embodiment, the multi-color light source is a so-called RGB light source. The light source unit 21 includes, for example, a plurality of LEDs configured to emit light of three colors of red, green, and blue (RGB), and a lens configured to emit the light emitted by the LEDs to the outside of the vehicle 1. The lens may be, for example, a condenser lens configured to project the light emitted from the LEDs as parallel light beams. The light source unit 21 can emit light of any color, and in the present embodiment, the light source unit 21 is configured to emit light of amber, pink, green, yellow, or the like. Amber is a color corresponding to a color range of a region including a long wavelength region of yellow and a short wavelength region of yellow-red in the JIS standard Z8110, and a region interposed between a yellow region and a short wavelength region of yellow-red in the JIS standard Z9101 of safety colors.

The illumination control unit 22 may include a processor and a memory similar to those of the vehicle control unit 3. The illumination control unit 22 is configured to control an operation of the light source unit 21. For example, the illumination control unit 22 is configured to control the light source unit 21 such that the light source unit 21 is turned on and turned off at a predetermined time interval. The predetermined time interval is set in a range of 500 milliseconds to 5000 milliseconds. In particular, the predetermined time interval is preferably set in a range of 1000 milliseconds to 2000 milliseconds. In the general operation mode, a time required for the light source unit 21 to transition from a turning-off state to a full turning-on state is within 200 milliseconds. The full turning-on state refers to a state in which the light source unit 21 is brightest. On the other hand, in the feeling expression mode, a time required for the light source unit 21 to transition from the turning-off state to the full turning-on state will be described later.

The illumination control unit 22 is configured to receive, via the vehicle control unit 3, a feeling expression signal generated by pressing down the thank you switch 4. When the illumination control unit 22 receives the feeling expression signal, the illumination control unit 22 turns on the light source unit 21 in the feeling expression mode. That is, the illumination control unit 22 is configured to turn on the light source unit 21 when a signal for transmitting feeling information (the feeling expression signal) to a traffic participant is input.

The illumination control unit 22 may be configured to control the light source unit 21 such that colors of light emitted from the light source unit 21 change over time. The illumination control unit 22 may be configured to control the light source unit 21 such that brightness of the light source unit 21 changes over time. For example, the illumination control unit 22 is configured to change the brightness of the light source unit 21 by changing a current value flowing through a light source included in the light source unit 21. In the general operation mode, the illumination control unit 22 may be configured to control the light source unit 21 to emit light of a color corresponding to the environment information acquired from the external device 30 that is communicably connected to the communication lamp 20 for a vehicle.

(First Example of First Embodiment)

Figure 3:
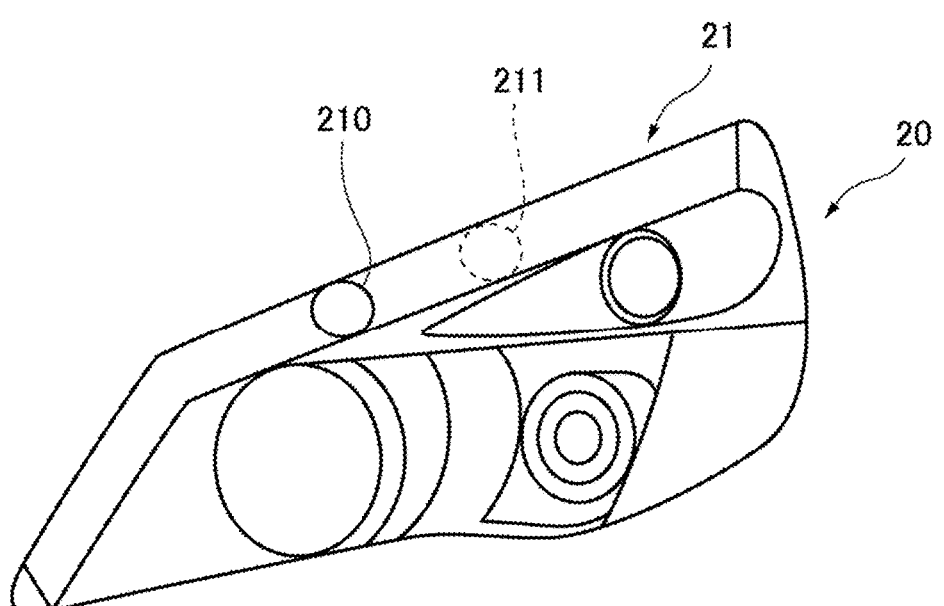
FIG. 3 is a diagram showing a communication lamp for a vehicle.

A first example of the first embodiment will be described with reference to FIGS. 3 and 4. As shown in FIG. 3, the light source unit 21 includes one light source 210 in the present example. As described above, the light source 210 is an RGB light source. In the present example, a user of the vehicle 1 presses the thank you switch 4 in order to express gratitude to a traffic participant near the vehicle 1.

Figure 4:
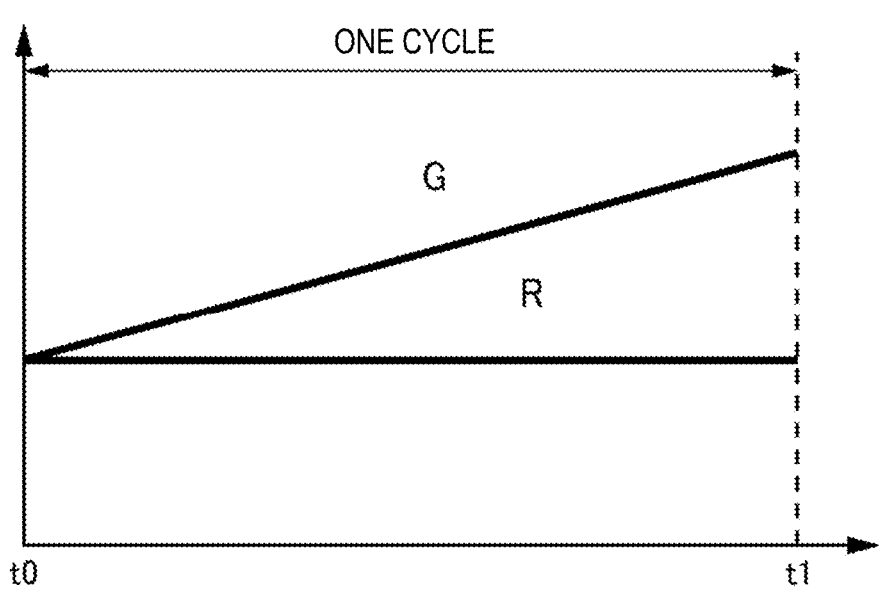
FIG. 4 is a diagram showing a change in a turning-on state of a light source unit.

As shown in FIG. 4, colors of the light emitted from the light source unit 21 are red and green in the present example. A ratio between red light and green light included in the light emitted from the light source unit 21 changes with time. In a graph shown in FIG. 4, a horizontal axis (an axis extending in the left-right direction in FIG. 4) represents time, and a vertical axis (an axis extending in the up-down direction in FIG. 4) represents the brightness of the light source unit 21.

When the user of the vehicle 1 presses the thank you switch 4, a feeling expression signal is generated and transmitted to the vehicle control unit 3. The vehicle control unit 3 is configured to transmit the received feeling expression signal to the illumination control unit 22. The illumination control unit 22 is configured to switch the light source unit 21 from the general operation mode to the feeling expression mode, based on the received feeling expression signal. Turning-on and turning-off of the light source unit 21 are repeated at a predetermined cycle in the feeling expression mode. In the present example, the predetermined cycle is 1000 milliseconds.

As shown in FIG. 4, light is emitted from the light source unit 21 between a time to and a time t1. The time to is a time when the user of the vehicle 1 presses the thank you switch 4. The time t1 is a time when 1000 milliseconds elapses from the time to.

The light emitted from the light source unit 21 at the time to includes the red light and the green light, and brightness of the red light and brightness of the green light are the same. Accordingly, a color of the light emitted from the light source unit 21 is yellow at the time t0.

The illumination control unit 22 is configured to control the light source unit 21 such that the brightness of the red light included in the light emitted from the light source unit 21 is constant from the time t0 to the time t1. On the other hand, the illumination control unit 22 is configured to control the light source unit 21 such that the green light included in the light emitted from the light source unit 21 is gradually brightened as time elapses from the time t0 to the time t1. Therefore, the light emitted from the light source unit 21 gradually changes from yellow to green (yellow-green) as time elapses. Green in the present specification includes not only complete green but also a green-based color such as yellow-green. The light source unit 21 is gradually brightened as time elapses.

At the time t1, the light source unit 21 is in the full turning-on state. State transition of the light source unit 21 after the time t1 is the same as the state transition of the light source unit 21 from the time t0 to the time t1.

According to the communication lamp 20 for a vehicle having the above configuration, light emitted from the light source unit 21 can be emitted to the outside with colors of the light being changed over time. An existing vehicle lamp such as a brake lamp or a turn signal lamp does not change a color of light. On the other hand, in the communication lamp 20 for a vehicle, since the colors of the light are changed, a traffic participant immediately notices that the communication lamp 20 for a vehicle is turned on with an intention different from an intention indicated by turning on a brake lamp or a turn signal lamp. Therefore, the communication lamp 20 for a vehicle enables the traffic participant to reliably feel predetermined information such as gratitude.

According to the communication lamp 20 for a vehicle having the above configuration, the brightness of the light source unit 21 is changed over time. Therefore, a traffic participant is likely to notice that the communication lamp 20 for a vehicle is turned on with an intention different from the intention indicated by turning on a brake lamp or a turn signal lamp. Therefore, the communication lamp 20 for a vehicle enables the traffic participant to reliably feel predetermined information such as gratitude.

According to the communication lamp 20 for a vehicle having the above configuration, one cycle of turning on and turning off the light source unit 21 is a time interval from 500 milliseconds to 5000 milliseconds (1000 milliseconds in the present example). The time interval is appropriate as a time interval for turning on and turning off the communication lamp 20 for a vehicle. Accordingly, the communication lamp 20 for a vehicle can transmit predetermined information such as gratitude to a traffic participant without giving a sense of discomfort.

According to the communication lamp 20 for a vehicle having the above configuration, the light source unit 21 emits light of green (yellow-green) which is a color effective for transmitting predetermined information such as gratitude to a traffic participant. Therefore, the communication lamp 20 for a vehicle enables the traffic participant to reliably feel predetermined information such as gratitude.

According to the communication lamp 20 for a vehicle having the above configuration, the illumination control unit 22 can control the light source unit 21 in the general operation mode and the feeling expression mode in which the light source unit 21 is operated according to the feeling expression signal which is an input signal from the user. In the feeling expression mode, the illumination control unit 22 controls the light source unit 21 such that colors of the light emitted from the light source unit 21 are changed over time. That is, the communication lamp 20 for a vehicle changes the colors of the light emitted from the light source unit 21 over time in the feeling expression mode. Therefore, the communication lamp 20 for a vehicle having the above configuration enables a traffic participant to immediately notice that the communication lamp 20 for a vehicle is turned on with an intention different from an intention indicated by turning on a brake lamp or a turn signal lamp. Therefore, the communication lamp 20 for a vehicle is likely to enable the traffic participant to reliably feel the predetermined information such as gratitude.

According to the communication lamp 20 for a vehicle having the above configuration, the illumination control unit 22 is configured to control the light source unit 21 to emit light of a color corresponding to the environment information acquired from the external device 30 in the general operation mode. Therefore, the communication lamp 20 for a vehicle can emit appropriate light according to the environment information from the light source unit 21.

(Second Example of First Embodiment)

Next, a second example of the first embodiment will be described with reference to FIG. 5. In the present example, the same components as those in the first example of the first embodiment are denoted by the same reference numerals, and description of repeated parts is omitted as appropriate. The present example is different from the first example of the first embodiment in a manner of changing the turning-on state of the light source unit 21. In the present example, a user of the vehicle 1 also presses the thank you switch 4 at a time t10 in order to express gratitude to a traffic participant near the vehicle 1.

Figure 5:
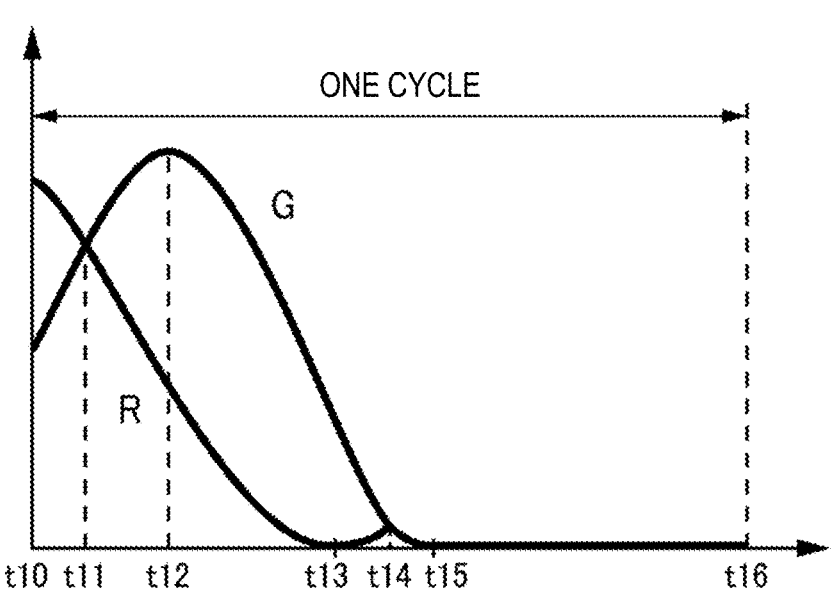
FIG. 5 is a diagram showing a change in the turning-on state of the light source unit.

As shown in FIG. 5, the light source unit 21 is in the turning-on state from the time t10 to a time t15. At the time t10, an R light source that emits red light is in a full turning-on state. At the time t10, red light included in the light emitted from the light source unit 21 is brighter than green light included in the light emitted from the light source unit 21. Therefore, a color of the light emitted from the light source unit 21 is amber at the time t10.

The illumination control unit 22 is configured to control the light source unit 21 such that the red light included in the light emitted from the light source unit 21 gradually becomes dark from the time t10 to a time t12. On the other hand, the illumination control unit 22 is configured to control the light source unit 21 such that the green light included in the light emitted from the light source unit 21 is gradually brightened from the time t10 to the time t12. At a time t11, brightness of the red light and brightness of the green light included in the light emitted from the light source unit 21 are equal to each other. Therefore, a color of the light emitted from the light source unit 21 is yellow at the time t11. The light emitted from the light source unit 21 gradually changes from yellow to green (yellow-green) from the time t11 to the time t12. At the time t12, a G light source that emits green light is in a full turning-on state.

The illumination control unit 22 is configured to control the light source unit 21 such that the red light and the green light included in the light emitted from the light source unit 21 gradually become dark from the time t12 to a time t13. Therefore, a color of the light emitted from the light source unit 21 is green (yellow-green) from the time t12 to the time t13. At the time t13, the light emitted from the light source unit 21 does not include the red light. Therefore, the color of the light emitted from the light source unit 21 is green at the time t13.

The illumination control unit 22 is configured to control the light source unit 21 such that the red light included in the light emitted from the light source unit 21 is gradually brightened from the time t13 to a time t14. On the other hand, the illumination control unit 22 is configured to control the light source unit 21 such that the green light included in the light emitted from the light source unit 21 gradually becomes dark from the time t13 to the time t14. As a result, the light emitted from the light source unit 21 gradually changes from green to yellow from the time t13 to the time t14. Accordingly, the color of the light emitted from the light source unit 21 is yellow at the time t14.

The illumination control unit 22 is configured to control the light source unit 21 such that the red light and the green light included in the light emitted from the light source unit 21 gradually become dark from the time t14 to the time t15. As a result, the light emitted from the light source unit 21 gradually becomes dark. At the time t15, the light source unit 21 is in a turning-off state.

The light source unit 21 remains in the turning-off state from the time t15 to a time t16. State transition of the light source unit 21 after the time t16 is the same as the state transition of the light source unit 21 from the time t10 to the time t16.

In the present example, the communication lamp 20 for a vehicle having the above configuration can obtain the same effects as those in the first example of the first embodiment.

According to the communication lamp 20 for a vehicle having the above configuration, the light source unit 21 emits light of amber and green (yellow-green) which are colors effective for transmitting predetermined information such as gratitude to a traffic participant. Therefore, the communication lamp 20 for a vehicle enables the traffic participant to reliably feel predetermined information such as gratitude.

(Third Example of First Embodiment)

Next, a third example of the first embodiment will be described with reference to FIG. 6. In the present example, the same components as those in the first example of the first embodiment are denoted by the same reference numerals, and description of repeated parts is omitted as appropriate. The present example is different from the first example of the first embodiment in a manner of changing the turning-on state of the light source unit 21. In the present example, a user of the vehicle 1 also presses the thank you switch 4 at a time t20 in order to express gratitude to a traffic participant near the vehicle 1.

Figure 6:
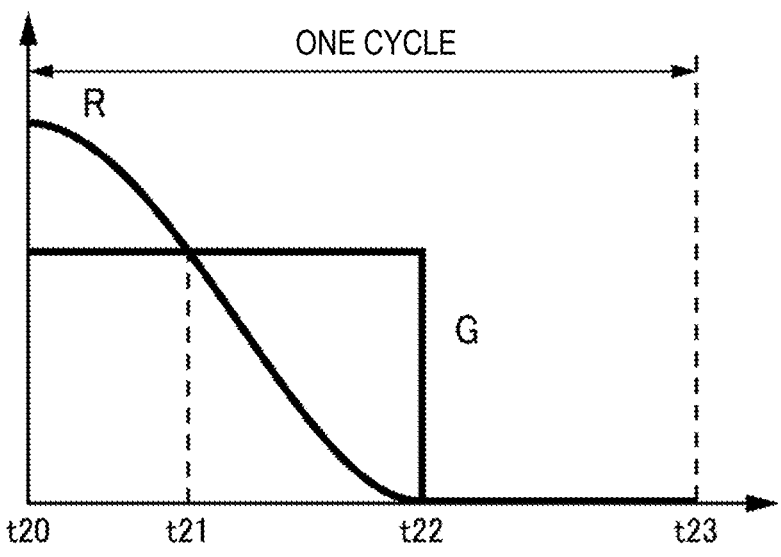
FIG. 6 is a diagram showing a change in the turning-on state of the light source unit.

As shown in FIG. 6, the light source unit 21 is in the turning-on state from the time t20 to a time t22. At the time t20, an R light source that emits red light is in a full turning-on state. At the time t20, red light included in the light emitted from the light source unit 21 is brighter than green light included in the light emitted from the light source unit 21. Therefore, a color of the light emitted from the light source unit 21 is amber at the time t20.

The illumination control unit 22 is configured to control the light source unit 21 such that the red light included in the light emitted from the light source unit 21 gradually becomes dark as time elapses from the time t20 to the time t22. On the other hand, the illumination control unit 22 is configured to control the light source unit 21 such that brightness of the green light included in the light emitted from the light source unit 21 does not change from the time t20 to the time t22. As a result, brightness of the red light and brightness of the green light included in the light emitted from the light source unit 21 are equal at a time t21. Therefore, a color of the light emitted from the light source unit 21 changes from amber to yellow from the time t20 to the time t21.

The color of the light emitted from the light source unit 21 changes from yellow to green from the time t21 to the time t22. At the time t22, the light source unit 21 is in a turning-off state.

The light source unit 21 remains in the turning-off state from the time t22 to a time t23. State transition of the light source unit 21 after the time t23 is the same as the state transition of the light source unit 21 from the time t20 to the time t23.

In the present example, the communication lamp 20 for a vehicle having the above configuration can obtain the same effects as those in the first example of the first embodiment.

(Fourth Example of First Embodiment)

Next, a fourth example of the first embodiment will be described with reference to FIG. 7. In the present example, the same components as those in the first example of the first embodiment are denoted by the same reference numerals, and description of repeated parts is omitted as appropriate. The present example is different from the first example of the first embodiment in that the light emitted from the light source unit 21 includes light of three colors (red, green, and blue), a time of one cycle is 2000 milliseconds, and a manner of changing the turning-on state of the light source unit 21 is different. In the present example, a user of the vehicle 1 also presses the thank you switch 4 at a time t30 in order to express gratitude to a traffic participant near the vehicle 1.

Figure 7:
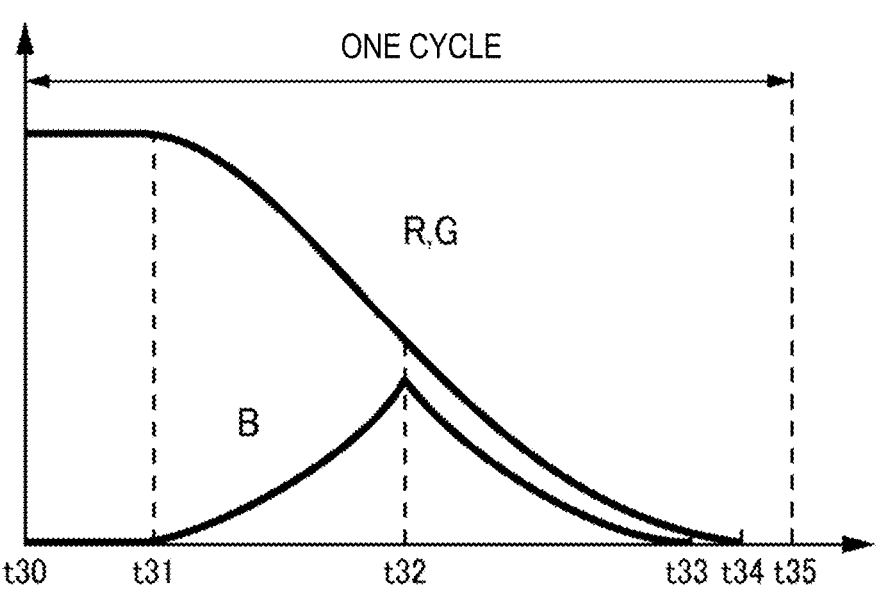
FIG. 7 is a diagram showing a change in the turning-on state of the light source unit.

As shown in FIG. 7, the light source unit 21 is in the turning-on state from the time t30 to a time t34. At the time t30, the light emitted from the light source unit 21 includes red light and green light, but does not include blue light.

Brightness of the red light and the green light included in the light emitted from the light source unit 21 does not change from the time t30 to a time t31. The light emitted from the light source unit 21 does not include the blue light from the time t30 to the time t31. Therefore, a color of the light emitted from the light source unit 21 is yellow from the time t30 to the time t31. The R light source that emits the red light and the G light source that emits the green light are in a full turning-on state from the time t30 to the time t31.

The illumination control unit 22 is configured to control the light source unit 21 such that the red light and the green light included in the light emitted from the light source unit 21 gradually become dark as time elapses from the time t31 to a time t32. On the other hand, the illumination control unit 22 is configured to control the light source unit 21 such that the blue light included in the light emitted from the light source unit 21 is gradually brightened as time elapses from the time t31 to the time t32. Therefore, a color of the light emitted from the light source unit 21 changes from yellow to a color close to white from the time t31 to the time t32. At the time t32, a B light source that emits the blue light is in a full turning-on state.

The illumination control unit 22 is configured to control the light source unit 21 such that the red light, the green light, and the blue light included in the light emitted from the light source unit 21 gradually become dark as time elapses from the time t32 to a time t33. Therefore, the light source unit 21 gradually becomes dark as time elapses from the time t32 to the time t33. At the time t33, the light emitted from the light source unit 21 does not include the blue light. Therefore, the color of the light emitted from the light source unit 21 is yellow at the time t33.

Brightness of the red light and the green light included in the light emitted from the light source unit 21 gradually decreases as time elapses from the time t33 to a time t34. The light emitted from the light source unit 21 does not include the blue light from the time t33 to the time t34. Therefore, the color of the light emitted from the light source unit 21 is yellow from the time t33 to the time t34. The light source unit 21 gradually becomes dark as time elapses from the time t33 to the time t34. At the time t34, the light source unit 21 is in a turning-off state.

The light source unit 21 remains in the turning-off state from the time t34 to a time t35. State transition of the light source unit 21 after the time t35 is the same as the state transition of the light source unit 21 from the time t30 to the time t35.

In the present example, the communication lamp 20 for a vehicle having the above configuration can obtain the same effects as those in the first example of the first embodiment.

(Fifth Example of First Embodiment)

Next, a fifth example of the first embodiment will be described with reference to FIG. 8. In the present example, the same components as those in the first example of the first embodiment are denoted by the same reference numerals, and description of repeated parts is omitted as appropriate. The present example is different from the first example of the first embodiment in that the light source unit 21 is configured to emit pink light in a full turning-on state (for example, an RGB light source includes the R light source at a number slightly more than the G light source and the B light source), and a manner of changing a turning-on state of the light source unit 21 is different. In the present example, a user of the vehicle 1 also presses the thank you switch 4 at a time t40 in order to express gratitude to a traffic participant near the vehicle 1.

Figure 8:
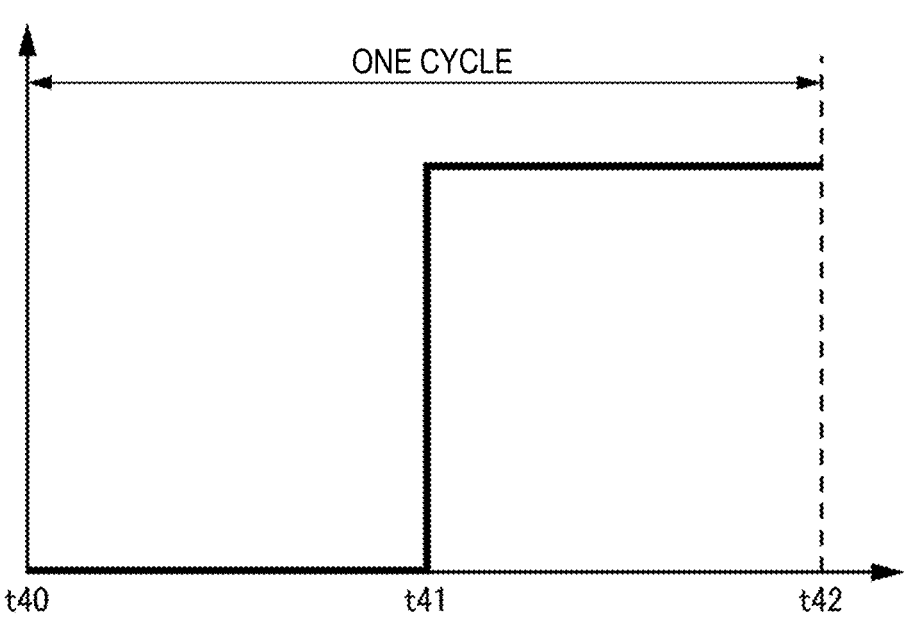
FIG. 8 is a diagram showing a change in the turning-on state of the light source unit.

As shown in FIG. 8, the light source unit 21 is in a turning-off state from the time t40 to a time t41. Therefore, brightness of the light source unit 21 does not change from the time t40 to the time t41. The light source unit 21 is in a turning-on state from the time t41 to a time t42. The light source unit 21 is in a full turning-on state from the time t41 to the time t42. Therefore, brightness of the light source unit 21 does not change from the time t41 to the time t42.

The illumination control unit 22 is configured to control the light source unit 21 such that pink light is emitted from the light source unit 21 from the time t41 to the time t42. At the time t42, the illumination control unit 22 is configured to control the light source unit 21 such that the light source unit 21 is in the turning-off state. State transition of the light source unit 21 after the time t42 is the same as the state transition of the light source unit 21 from the time t40 to the time t42.

(Sensory Test)

A reason why the light source unit 21 is configured to emit pink light in the present example will be described. The inventors performed a sensory test related to colors of light that are likely to make a driver, a pedestrian, or the like have a warm feeling. Contents of the sensory test are related to the light emitted from the light source unit 21, and the test is performed to test a person is likely to have a warm feeling at what kind of wavelength and x and y when gratitude is expressed by a wavelength of the light and x and y in an xy chromaticity diagram of a color of the light.

As a result of the sensory test, it was confirmed that light having the wavelength of 500 nm or more evoked a warm feeling of gratitude. For example, when x in the xy chromaticity diagram increased, red was strong, and as a result of the sensory test, it was found that a person had a strong feeling of warning when x in the xy chromaticity diagram was larger than 0.6. On the other hand, when x in the xy chromaticity diagram was 0.6 or less, it was confirmed that a person recognized a warm color that does not evoke a strong feeling. Further, when x in the xy chromaticity diagram was 0.6 or less, it was confirmed that it is easy to recognize an intention different from an intention indicated by turning on the existing brake lamp or turn signal lamp. Based on the above results, the inventors noticed that light having a wavelength of 500 nm or more and x in the xy chromaticity diagram of 0.6 or less can reliably express gratitude to a traffic participant.

According to the communication lamp 20 for a vehicle having the above configuration, since an average value of a wavelength of pink light based on a wavelength of pink light in a spectrum of the pink light and an intensity of light at that wavelength is 500 nm or more, the communication lamp 20 for a vehicle enables the traffic participant to have a warm feeling of gratitude. According to the communication lamp 20 for a vehicle having the above configuration, since x in the xy chromaticity diagram is 0.6 or less, the communication lamp 20 for a vehicle enables the traffic participant to recognize a warm color. Further, since x in the xy chromaticity diagram is 0.6 or less, the communication lamp 20 for a vehicle enables the traffic participant to recognize an intention different from an intention indicated by turning on an existing brake lamp or turn signal lamp. Therefore, the communication lamp 20 for a vehicle enables the traffic participant to reliably feel gratitude.

According to the communication lamp 20 for a vehicle having the above configuration, the light source unit 21 emits light of pink which is a color effective for transmitting predetermined information such as gratitude to a traffic participant. Therefore, the communication lamp 20 for a vehicle enables the traffic participant to reliably feel predetermined information such as gratitude.

(Sixth Example of First Embodiment)

Next, a sixth example of the first embodiment will be described with reference to FIG. 9. In the present example, the same components as those in the fifth example of the first embodiment are denoted by the same reference numerals, and description of repeated parts is omitted as appropriate. The present example is different from the fifth example of the first embodiment in that a time of one cycle is 2000 milliseconds and a manner of changing the turning-on state of the light source unit 21 is different. In the present example, the light source unit 21 also emits pink light. In the present example, a user of the vehicle 1 also presses the thank you switch 4 at a time t50 in order to express gratitude to a traffic participant near the vehicle 1.

Figure 9:
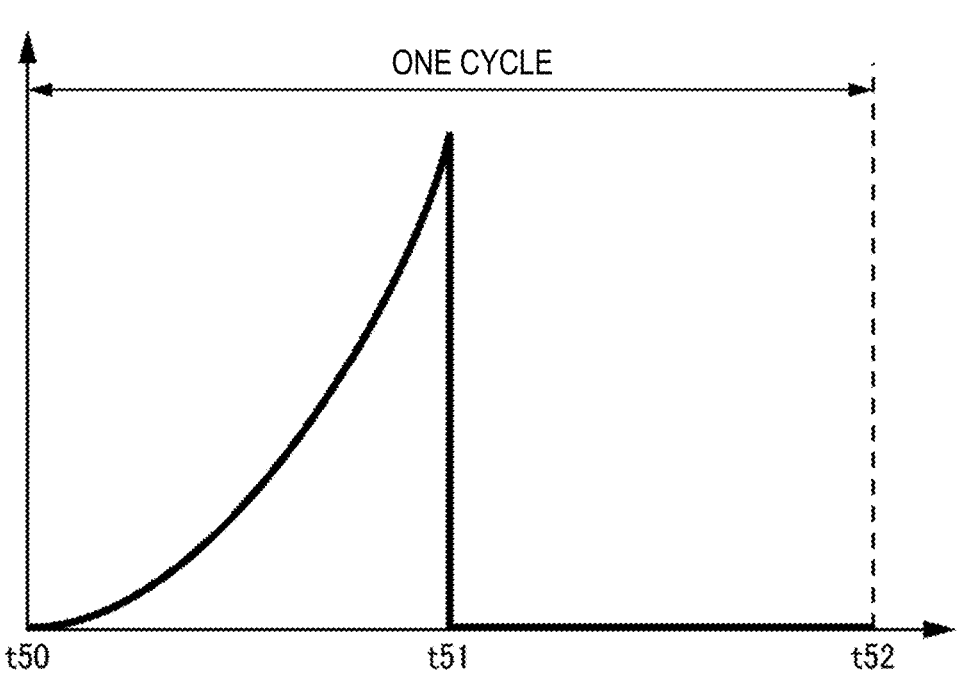
FIG. 9 is a diagram showing a change in the turning-on state of the light source unit.

As shown in FIG. 9, the light source unit 21 is gradually brightened from the time t50 to a time t51. An increase amount per unit time in a current value flowing through a light source included in the light source unit 21 gradually increases as time elapses from the time t50 to the time t51.

At the time t51, the light source unit 21 is in a full turning-on state. The illumination control unit 22 is configured to control the light source unit 21 such that the light source unit 21 is in a turning-off state from the time t51 to a time t52. State transition of the light source unit 21 after the time t52 is the same as the state transition of the light source unit 21 from the time t50 to the time t52.

In the present example, the communication lamp 20 for a vehicle having the above configuration can obtain the same effects as those in the fifth example of the first embodiment.

(First Example of Second Embodiment)

Next, a first example of a second embodiment will be described with reference to FIGS. 10 to 15. In the present embodiment, the same components as those in the first embodiment are denoted by the same reference numerals, and description of repeated parts is omitted as appropriate. A communication lamp 20A for a vehicle according to the second embodiment is different from the communication lamp 20 for a vehicle according to the first embodiment in that a light source unit 21A (see FIGS. 11 to 15) is provided instead of the light source unit 21. As shown in FIGS. 11 to 15, the light source unit 21A includes four light sources 211A to 214A. The light sources 211A to 214A are, for example, RGB light sources. In the present example, amber light is emitted from the light sources 211A to 214A. Therefore, amber light is emitted from the light source unit 21A. The illumination control unit 22 is configured to control the light source unit 21A such that the number of light sources to be turned on increases over time. The illumination control unit 22 is configured to control the light source unit 21A such that brightness of the light source unit 21A changes over time.

Figure 10:
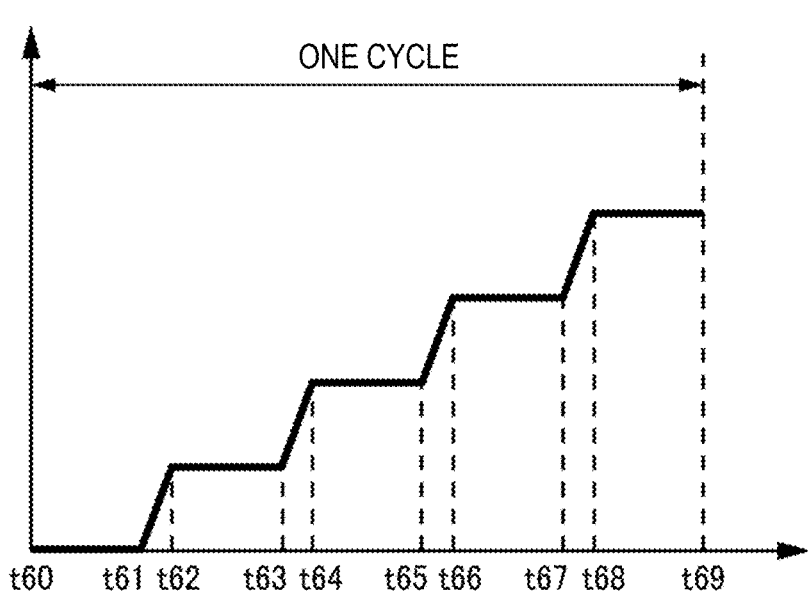
FIG. 10 is a diagram showing a change in the turning-on state of the light source unit.

In a graph shown in FIG. 10, a horizontal axis (an axis extending in the left-right direction in FIG. 10) represents time, and a vertical axis (an axis extending in the up-down direction in FIG. 10) represents the brightness of the light source unit 21A. In the present example, a user of the vehicle 1 also presses the thank you switch 4 at a time t60 in order to express gratitude to a traffic participant near the vehicle 1. Similar to the first embodiment, when the user of the vehicle 1 presses the thank you switch 4, the illumination control unit 22 switches the light source unit 21A from the general operation mode to the feeling expression mode based on the received feeling expression signal in the present embodiment. One cycle in the present example is a time from the time t60 to a time t69. The time from the time t60 to the time t69 is 2000 milliseconds.

Next, transition of a turning-on state of the light source unit 21A will be described with reference to FIGS. 10 to 15. As shown in FIG. 10, the illumination control unit 22 is configured to control the light source unit 21A such that light emitted from the light source unit 21A is brightened in a stepwise manner as time elapses. In the present example, the light emitted from the light source unit 21A continues to be brightened in a stepwise manner. Brightness of the light source unit 21A changes in a stepwise manner with a state in which the brightness of the light source unit 21A does not change and a state in which the brightness of the light source unit 21A changes, which are alternately repeated. In the present example, the current value flowing through the light source unit 21A increases every 400 milliseconds or so. Alternatively, a time interval from an increase in the current value flowing through the light source unit 21A to a subsequent increase in the current value flowing through the light source unit 21A is not limited to about 400 milliseconds. For example, the current value flowing through the light source unit 21A may increase every 333 milliseconds or so. In this case, the light source unit 21A includes five light sources. In the present example, an increase amount in the current value flowing through the light source unit 21A is constant. Alternatively, the increase amount may not be constant.

Figure 11:
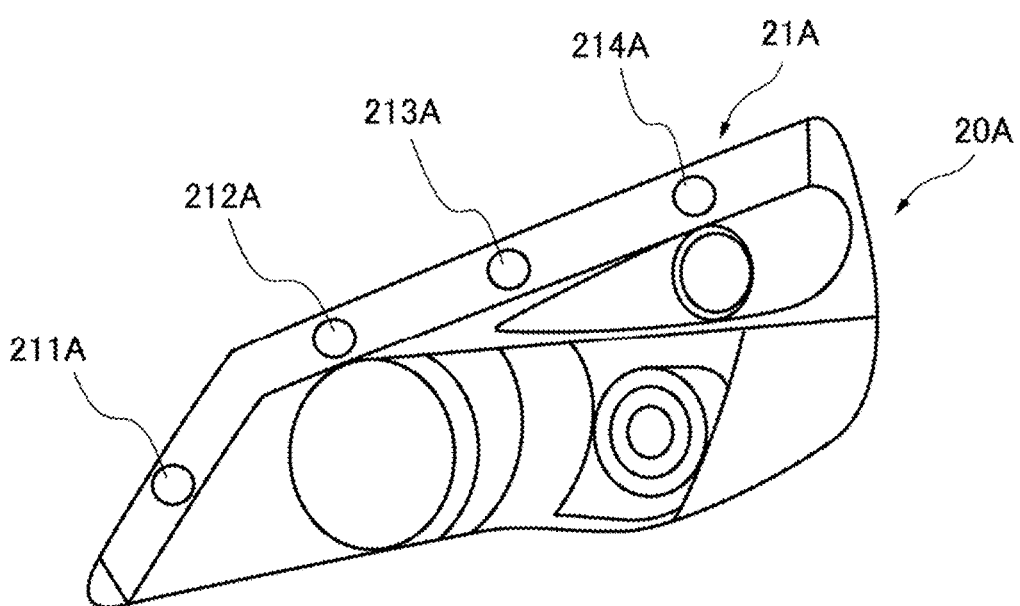
FIG. 11 is a diagram showing the communication lamp for a vehicle in a turning-off state.

As shown in FIGS. 10 and 11, a state of the light source unit 21A is in a turning-off state from the time t60 to a time t61. That is, as shown in FIG. 11, no light is emitted from all of the light sources 211A to 214A included in the light source unit 21A from the time t60 to the time t61.

Figure 12:
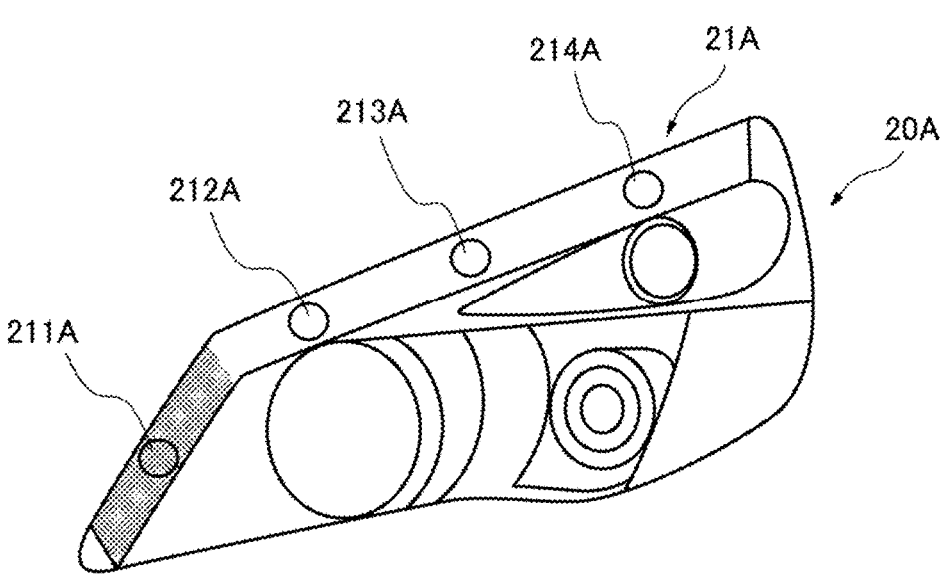
FIG. 12 is a diagram showing the communication lamp for a vehicle in the turning-on state.

As shown in FIGS. 10 and 12, only the light source 211A of the light sources 211A to 214A included in the light source unit 21A is in a turning-on state from the time t61 to a time t63. Accordingly, the turning-on state of the light source unit 21A from the time t61 to the time t63 is a state shown in FIG. 12.

As shown in FIG. 10, the illumination control unit 22 is configured to control the light source unit 21A such that the light emitted from the light source unit 21A is brightened in a stepwise manner as time elapses from the time t61 to a time t62. The illumination control unit 22 is configured to control the light source unit 21A such that brightness of the light emitted from the light source unit 21A does not change from the time t62 to the time t63.

Figure 13:
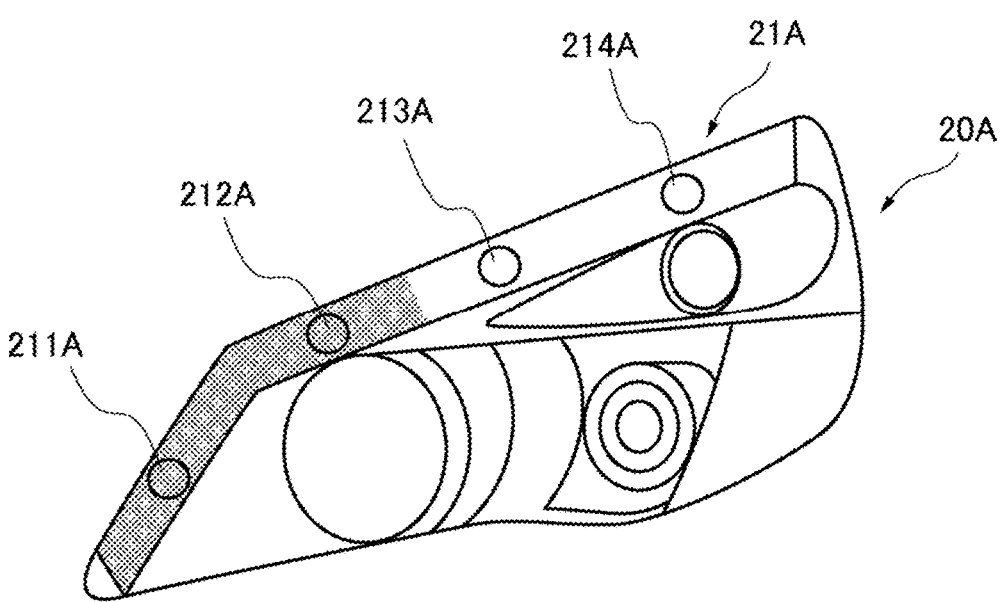
FIG. 13 is a diagram showing the communication lamp for a vehicle in the turning-on state.

As shown in FIGS. 10 and 13, the light sources 211A and 212A of the light sources 211A to 214A included in the light source unit 21A are in a turning-on state from the time t63 to a time t65. Accordingly, the turning-on state of the light source unit 21A from the time t63 to the time t65 is a state shown in FIG. 13.

As shown in FIG. 10, the illumination control unit 22 is configured to control the light source unit 21A such that the light emitted from the light source unit 21A is brightened in a stepwise manner as time elapses from the time t63 to a time t64. The illumination control unit 22 is configured to control the light source unit 21A such that brightness of the light emitted from the light source unit 21A does not change from the time t64 to the time t65.

Figure 14:
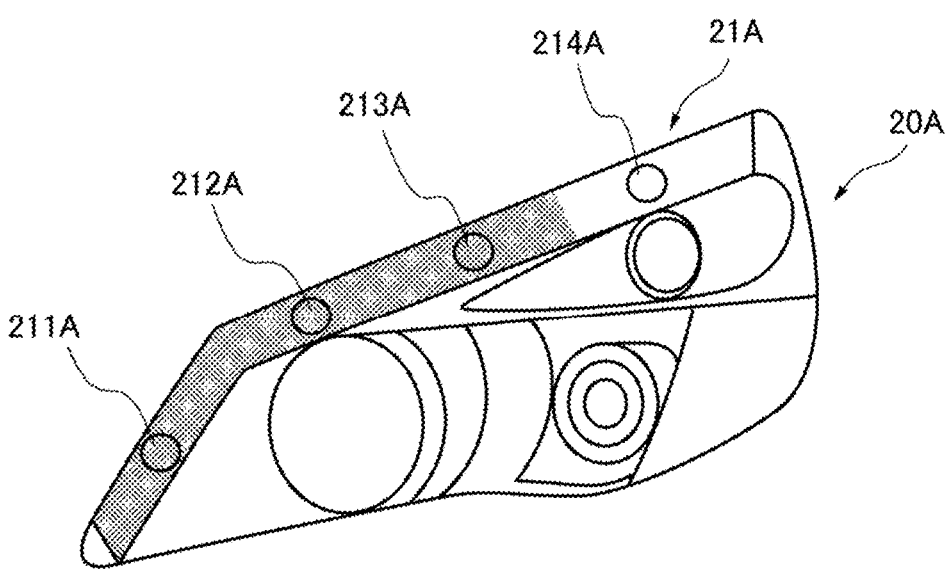
FIG. 14 is a diagram showing the communication lamp for a vehicle in the turning-on state.

As shown in FIGS. 10 and 14, the light sources 211A to 213A of the light sources 211A to 214A included in the light source unit 21A are in a turning-on state from the time t65 to a time t67. Accordingly, the turning-on state of the light source unit 21A from the time t65 to the time t67 is a state shown in FIG. 14.

As shown in FIG. 10, the illumination control unit 22 is configured to control the light source unit 21A such that the light emitted from the light source unit 21A is brightened in a stepwise manner as time elapses from the time t65 to a time t66. The illumination control unit 22 is configured to control the light source unit 21A such that brightness of the light emitted from the light source unit 21A does not change from the time t66 to the time t67.

Figure 15:
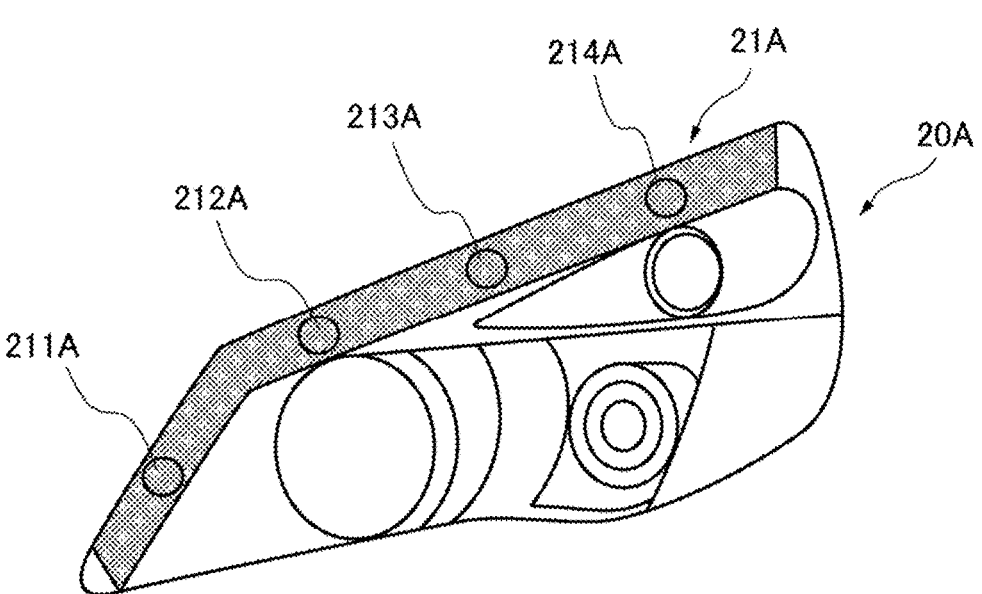
FIG. 15 is a diagram showing the communication lamp for a vehicle in a full turning-on state.

As shown in FIGS. 10 and 15, all of the light sources 211A to 214A included in the light source unit 21A are in a turning-on state from the time t67 to the time t69. Accordingly, the turning-on state of the light source unit 21A from the time t67 to the time t69 is a state shown in FIG. 15.

As shown in FIG. 10, the illumination control unit 22 is configured to control the light source unit 21A such that the light emitted from the light source unit 21A is brightened in a stepwise manner as time elapses from the time t67 to a time t68. The illumination control unit 22 is configured to control the light source unit 21A such that brightness of the light emitted from the light source unit 21A does not change from the time t68 to the time t69. Therefore, the turning-on state of the light source unit 21A is a full turning-on state from the time t68 to the time t69. In the feeling expression mode, a time required for the light source unit 21A to transition from the turning-off state to the full turning-on state (that is, a time from the time t60 to the time t68) is about 1700 milliseconds.

At the time t69, the illumination control unit 22 is configured to control the light source unit 21A such that the light source unit 21A is in the turning-off state. State transition of the light source unit 21A after the time t69 is the same as the state transition of the light source unit 21A from the time t60 to the time t69.

The communication lamp 20A for a vehicle having the above configuration turns on the light source unit while changing the brightness of the light source unit 21A. Since a traffic participant is not surprised when the communication lamp 20A for a vehicle is turned on in this manner, the communication lamp 20A for a vehicle can enable the traffic participant to reliably feel predetermined information such as gratitude.

According to the communication lamp 20A for a vehicle having the above configuration, the illumination control unit 22 turns on the light source unit 21A in the general operation mode or the feeling expression mode. Since a manner of turning on the light source unit 21A is different between the general operation mode and the feeling expression mode, when the light source unit 21A is turned on in the feeling expression mode different from the general operation mode, a traffic participant can easily recognize that gratitude or the like is transmitted. Therefore, the communication lamp 20A for a vehicle enables the traffic participant to reliably feel the predetermined information such as gratitude.

According to the communication lamp 20A for a vehicle having the above configuration, the light source unit 21A is turned on when the feeling expression signal that is a signal for transmitting feeling information is input. Therefore, the communication lamp 20A for a vehicle enables the traffic participant to reliably feel predetermined information such as gratitude to the traffic participant.

According to the communication lamp 20A for a vehicle having the above configuration, since the brightness of the light source unit 21A is changed in a stepwise manner, the traffic participant can easily recognize that predetermined information such as gratitude is transmitted.

According to the communication lamp 20A for a vehicle having the above configuration, the brightness of the light source unit 21A is changed in a stepwise manner with a state in which the brightness of the light source unit 21A does not change and a state in which the brightness of the light source unit 21A changes, which are alternately repeated. Therefore, the traffic participant is not surprised when the communication lamp 20A for a vehicle is turned on in such a manner. Accordingly, the traffic participant can easily recognize that predetermined information such as gratitude is transmitted.

According to the communication lamp 20A for a vehicle having the above configuration, since the light emitted from the light source unit 21A continues to be brightened in a stepwise manner, the traffic participant can easily recognize that predetermined information such as gratitude is transmitted.

According to the communication lamp 20A for a vehicle having the above configuration, one cycle of turning on and turning off the light source unit is a time interval from 500 milliseconds to 5000 milliseconds (in the present example, 2000 milliseconds). The time interval is appropriate as a time interval for turning on and turning off the communication lamp for a vehicle. Accordingly, according to the communication lamp 20A for a vehicle, predetermined information such as gratitude can be transmitted to a traffic participant without giving a sense of discomfort.

According to the communication lamp 20A for a vehicle having the above configuration, the illumination control unit 22 can control the light source unit 21A in the general operation mode in which any one of a turn signal lamp, a brake lamp, and a backup lamp exhibits an original function, and in the feeling expression mode different from the general operation mode. A manner of turning on the light source unit 21A is different between the general operation mode and the feeling expression mode. Therefore, the communication lamp 20A for a vehicle enables a traffic participant to reliably feel the predetermined information such as gratitude when light is emitted from the light source unit 21A in the feeling expression mode.

According to the communication lamp 20A for a vehicle having the above configuration, a time required for the light source unit 21A to transition from the turning-off state to the full turning-on state in the general operation mode is shorter than a time required for the light source unit 21A to transition from the turning-off state to the full turning-on state in the feeling expression mode. Accordingly, from the perspective of a traffic participant, the transition of the turning-on state in the feeling expression mode appears to change more gradually than the transition of the turning-on state in the general operation mode. Therefore, the traffic participant can reliably feel predetermined information such as gratitude when light is emitted from the light source unit 21A in the feeling expression mode.

(Second Example of Second Embodiment)

Next, a second example of the second embodiment will be described with reference to FIG. 16. In the present example, the same components as those in the first example of the second embodiment are denoted by the same reference numerals, and description of repeated parts is omitted as appropriate. The present example is different from the first example of the second embodiment in that a color of the light emitted from the light source unit 21A is green (yellow-green), a time of one cycle is 1000 milliseconds, and a manner of changing the turning-on state of the light source unit 21A is different. In the present example, the light source unit 21A includes one or more light sources. The light source is, for example, an RGB light source. In the present example, a user of the vehicle 1 also presses the thank you switch 4 at a time t70 in order to express gratitude to a traffic participant near the vehicle 1.

Figure 16:
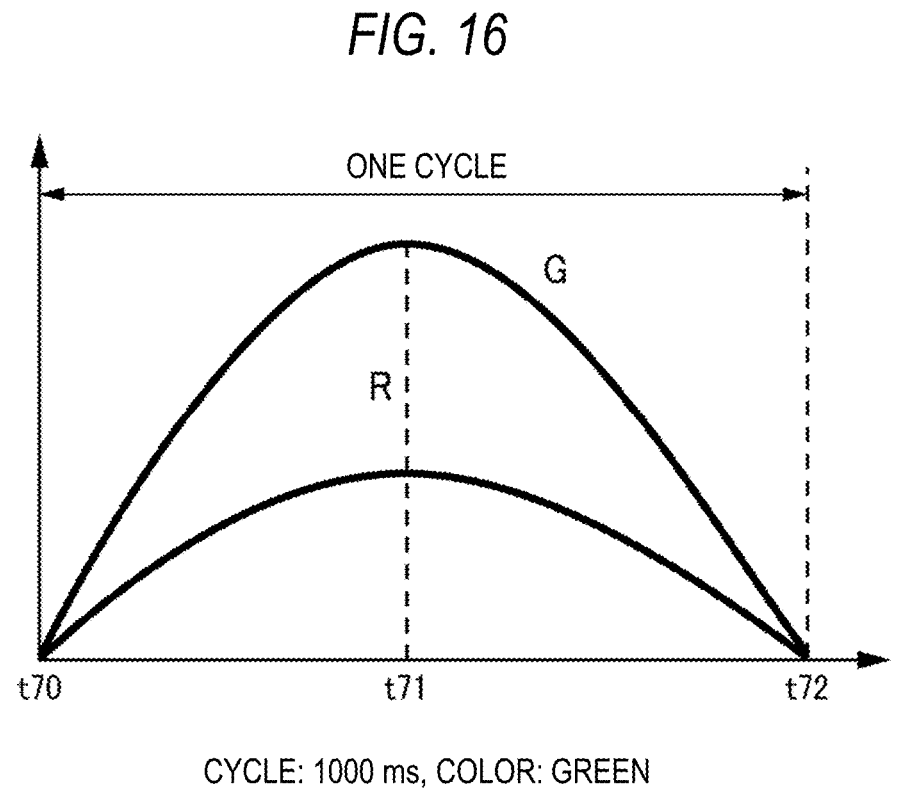

As shown in FIG. 16, the light source unit 21A is in a turning-off state at the time t70. The illumination control unit 22 is configured to control the light source unit 21A such that green light and red light included in the light emitted from the light source unit 21A are gradually brightened as time elapses from the time t70 to a time t71. An increase amount per unit time in the brightness of the green light included in the light emitted from the light source unit 21A is larger than an increase amount per unit time in the brightness of the red light included in the light emitted from the light source unit 21A. Therefore, a color of the light emitted from the light source unit 21A is green (yellow-green) from the time t70 to the time t71. The light source unit 21A is in the full turning-on state at the time t71. Therefore, a time required for the light source unit 21A to transition from the turning-off state to the full turning-on state in the feeling expression mode is 500 milliseconds.

The illumination control unit 22 is configured to control the light source unit 21A such that the green light and the red light included in the light emitted from the light source unit 21A gradually become dark as time elapses from the time t71 to a time t72. A decrease amount per unit time of the brightness of the green light included in the light emitted from the light source unit 21A is larger than a decrease amount per unit time of the brightness of the red light included in the light emitted from the light source unit 21A. The color of the light emitted from the light source unit 21A is green (yellow-green) from the time t71 to the time t72.

The light source unit 21A is in the turning-off state in the time t72. State transition of the light source unit 21A after the time t72 is the same as the state transition of the light source unit 21A from the time t70 to the time t72.

In the present example, the communication lamp 20A for a vehicle having the above configuration can obtain the same effects as those in the first example of the second embodiment.

The present disclosure is not limited to the above-described embodiments, and may be appropriately modified, improved, or the like. In addition, materials, shapes, dimensions, numerical values, forms, numbers, arrangement places, and the like of components in the above-described embodiments are freely selected and are not limited as long as the present disclosure can be implemented.

Although a manner of turning on the light source units 21 and 21A is different between the general operation mode and the feeling expression mode in the above-described embodiments, the present disclosure is not limited thereto. For example, a manner of turning off the light source units 21 and 21A may be different, or a manner of turning on the light source units 21 and 21A and a manner of turning off the light source units 21 and 21A may be different between the general operation mode and the feeling expression mode.

In the first embodiment described above, the light source unit 21 includes one light source 210. Alternatively, the light source unit 21 may include, for example, a first light source (the light source 210 indicated by a solid line in FIG. 3) that emits first light and a second light source (a light source 211 indicated by a broken line in FIG. 3) that emits second light having a color different from a color of the first light. In this case, the illumination control unit 22 controls the light source unit 21 such that brightness of at least one of the first light source (the light source 210) and the second light source (the light source 211) changes over time, thereby achieving a change in the turning-on state described above. According to this configuration, since the brightness of at least one of the first light source (the light source 210) that emits the first light and the second light source (the light source 211) that emits the second light changes over time, a traffic participant is likely to notice that the communication lamp 20 for a vehicle is turned on with an intention different from an intention indicated by turning on a brake lamp or a turn signal lamp. Therefore, the communication lamp 20 for a vehicle enables the traffic participant to reliably feel the predetermined information such as gratitude.

In the first example to the fourth example of the first embodiment, the light source unit 21 emits light of amber, green (yellow-green), and yellow. Alternatively, the light source unit 21 may emit, for example, pink light.

In the first example of the second embodiment, the light source unit 21A includes the four light sources 211A to 214A. Alternatively, the light source unit 21A may include one or more light sources. That is, the number of light sources included in the light source unit 21A is not limited to four.

Although the light source unit 21A is in the turning-off state at the time t60, and is brightened as time elapses in the first example of the second embodiment, the present disclosure is not limited thereto. For example, the light source unit 21A may be in the full turning-on state at the time t60, and light emitted from the light source unit 21A may become dark as time elapses.

Although the time required for the light source unit 21A to transition from the turning-off state to the full turning-on state in the general operation mode is shorter than the time required for the light source unit 21A to transition from the turning-off state to the full turning-on state in the feeling expression mode in the second embodiment described above, the present disclosure is not limited thereto. For example, a time required for the light source unit 21A to transition from the full turning-on state to the turning-off state in the general operation mode may be shorter than a time required for the light source unit 21A to transition from the full turning-on state to the turning-off state in the feeling expression mode. In this case, from the perspective of a traffic participant, the transition of the turning-on state in the feeling expression mode also appears to change more gradually than the transition of the turning-on state in the general operation mode. Therefore, in this case, the traffic participant can also reliably feel predetermined information such as gratitude when light is emitted from the light source unit 21A in the feeling expression mode.

Although the time required for the light source unit 21A to transition from the turning-off state to the full turning-on state in the general operation mode is shorter than the time required for the light source unit 21A to transition from the turning-off state to the full turning-on state in the feeling expression mode in the second embodiment described above, the present disclosure is not limited thereto. For example, a time required for the light source unit 21A to transition from the full turning-on state to the turning-off state in the general operation mode may be shorter than a time required for the light source unit 21A to transition from the full turning-on state to the turning-off state in the feeling expression mode. In addition, the time required for the light source unit 21A to transition from the turning-off state to the full turning-on state in the general operation mode may be shorter than the time required for the light source unit 21A to transition from the turning-off state to the full turning-on state in the feeling expression mode, and the time required for the light source unit 21A to transition from the full turning-on state to the turning-off state in the general operation mode may be shorter than the time required for the light source unit 21A to transition from the full turning-on state to the turning-off state in the feeling expression mode. In these cases, from the perspective of a traffic participant, the transition of the turning-on state in the feeling expression mode also appears to change more gradually than the transition of the turning-on state in the general operation mode. Therefore, in these cases, a traffic participant can also reliably feel predetermined information such as gratitude when light is emitted from the light source unit 21A in the feeling expression mode.

Figure 17:
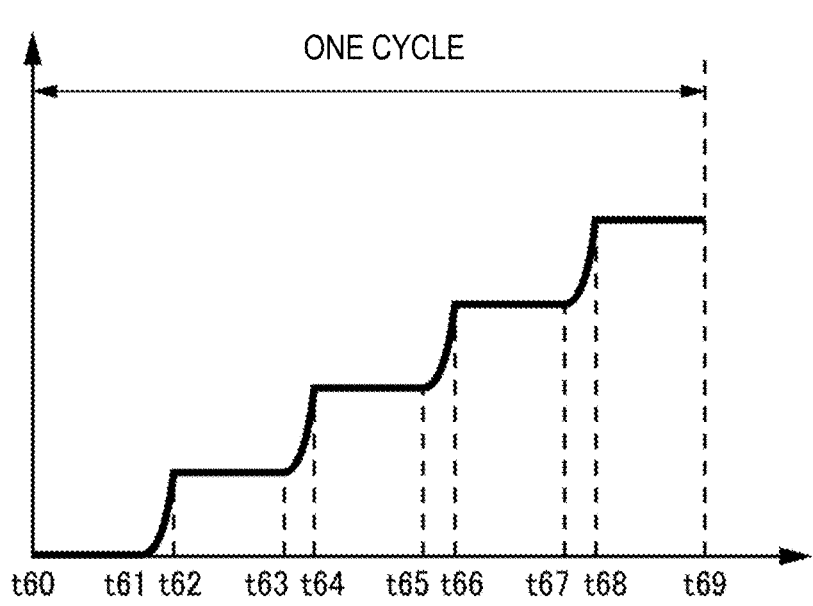
FIG. 17 is a diagram showing a change in the turning-on state of the light source unit.

Although a change amount per unit time in the brightness of the light source unit 21A is constant in a state in which the brightness of the light source unit 21A is changed as shown in FIG. 10 in the first example of the second embodiment, the present disclosure is not limited thereto. As shown in an example in FIG. 17, in a state in which the brightness of the light source unit 21A is changed, a change amount per unit time of the brightness of the light source unit 21A at the start of the change in the brightness of the light source unit 21A may be smaller than a change amount per unit time of the brightness of the light source unit 21A at a time other than the start of the change. The present disclosure is not limited to the example shown in FIG. 17, and in a state in which the brightness of the light source unit 21A is changed, a change amount per unit time of the brightness of the light source unit 21A at the end of the change in the brightness of the light source unit 21A may be smaller than a change amount per unit time of the brightness of the light source unit 21A at a time other than the end of the change. In these cases, a traffic participant is not surprised when the communication lamp 20A for a vehicle is turned on in such a manner. Accordingly, the traffic participant can easily recognize that predetermined information such as gratitude is transmitted.

Figure 18:
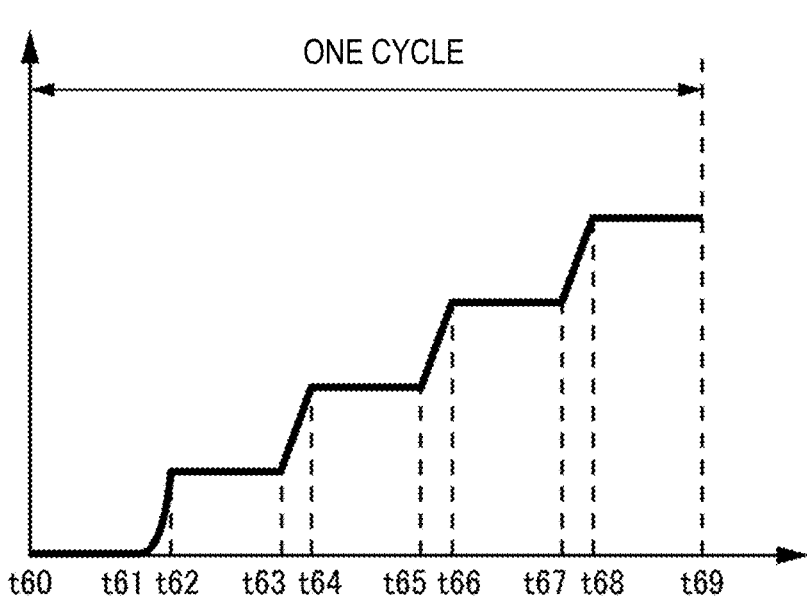
FIG. 18 is a diagram showing a change in the turning-on state of the light source unit.

Although a change amount per unit time in the brightness of the light source unit 21A is constant in a state in which the brightness of the light source unit 21A is changed as shown in FIG. 10 in the first example of the second embodiment, the present disclosure is not limited thereto. For example, as shown in FIG. 18, in a state in which the brightness of the light source unit 21A is changed, a manner of changing the brightness of the light source unit 21A from the time t61 to the time t62 may be different from a manner of changing the brightness of the light source unit 21A in another period (from the time t63 to the time t64, and the like).

As described above, the following matters are disclosed in the present specification.

(1) A communication lamp for a vehicle including:

a light source unit including a multi-color light source configured to emit light of a plurality of colors; and an illumination control unit configured to control the light source unit such that colors of the light emitted from the light source unit change over time.

(2) The communication lamp for a vehicle according to (1), in which the illumination control unit is configured to control the light source unit such that brightness of the light source unit changes over time.

(3) The communication lamp for a vehicle according to (1) or (2), in which the light source unit includes at least a first light source configured to emit first light and a second light source configured to emit second light having a color different from a color of the first light, and the illumination control unit is configured to control the light source unit such that brightness of at least one of the first light source and the second light source changes over time.

(4) The communication lamp for a vehicle according to any one of (1) to (3), in which the illumination control unit is configured to control the light source unit such that the light source unit is turned on and turned off at a predetermined time interval, and the predetermined time interval is from 500 milliseconds to 5000 milliseconds.

(5) The communication lamp for a vehicle according to any one of (1) to (4), in which the light source unit is configured to emit light of at least one color of amber, pink, and green.

(6) The communication lamp for a vehicle according to any one of (1) to (5), in which the illumination control unit is configured to control the light source unit:

in a general operation mode in which the light source unit is continuously turned on without changing during general time; and in a feeling expression mode in which the light source unit is operated according to an input signal from a user, and in the feeling expression mode, the illumination control unit is configured to control the light source unit such that a color of the light emitted from the light source unit changes over time.

(7) The communication lamp for a vehicle according to (6), in which in the general operation mode, the illumination control unit is configured to control the light source unit such that the light source unit emits light of a color corresponding to environment information, the environment information being acquired from an external device that is communicably connected to the communication lamp for a vehicle.

(8) A communication lamp for a vehicle, in which the communication lamp is configured to blink and turn on light having a wavelength of 500 nm or more and having x in an xy chromaticity diagram of 0.6 or less, which expresses gratitude.

The present application is based on the Japanese patent application (JP2022-013307A) filed on Jan. 31, 2022, and the contents thereof are incorporated herein by reference.

The invention claimed is:

1. A communication lamp for a vehicle, the communication lamp being a turn signal lamp, a brake lamp, or a backup lamp for transmitting predetermined information to a traffic participant by turning on or turning off the communication lamp, and the communication lamp comprising:

a light source unit including a multi-color light source configured to emit light of a plurality of colors; and an illumination control unit configured to control the light source unit such that colors of the light emitted from the light source unit change over time, wherein the illumination control unit is configured to control the light source unit:

in a general operation mode in which the light source unit is continuously turned on without changing during general time; and in a feeling expression mode in which the light source unit is operated according to an input signal from a user, wherein in the feeling expression mode, the illumination control unit is configured to control the light source unit such that a color of the light emitted from the light source unit changes over time, and wherein the illumination control unit is configured to switch the light source unit from the general operation mode to the feeling expression mode, based on a feeling expression signal received by the illumination control unit.

2. The communication lamp for a vehicle according to claim 1, wherein the illumination control unit is configured to control the light source unit such that brightness of the light source unit changes over time.

3. The communication lamp for a vehicle according to claim 1, wherein the light source unit includes at least a first light source configured to emit first light and a second light source configured to emit second light having a color different from a color of the first light, and the illumination control unit is configured to control the light source unit such that brightness of at least one of the first light source and the second light source changes over time.

4. The communication lamp for a vehicle according to claim 1, wherein the illumination control unit is configured to control the light source unit such that the light source unit is turned on and turned off at a predetermined time interval, and the predetermined time interval is from 500 milliseconds to 5000 milliseconds.

5. The communication lamp for a vehicle according to claim 1, wherein the light source unit is configured to emit light of at least one color of amber, pink, and green.

6. The communication lamp for a vehicle according to claim 5, wherein, in the general operation mode, the illumination control unit is configured to control the light source unit such that the light source unit emits light of a color corresponding to environment information, the environment information being acquired from an external device that is communicably connected to the communication lamp for a vehicle.

* * * * *